(12) United States Patent
Sitaraman et al.

(10) Patent No.: US 6,385,653 B1
(45) Date of Patent: May 7, 2002

(54) RESPONDING TO NETWORK ACCESS REQUESTS USING A TRANSPARENT MEDIA ACCESS AND UNIFORM DELIVERY OF SERVICE

(75) Inventors: Aravind Sitaraman, Santa Clara; Shuxian Lou, San Jose; Shujin Zhang, San Mateo; Sampath Kumar Sthothra Bhasham, Santa Clara, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/184,779

(22) Filed: Nov. 2, 1998

(51) Int. Cl.[7] ............................................. G06F 15/16

(52) U.S. Cl. ..................... 709/230; 709/225; 709/203

(58) Field of Search ................................. 709/230, 203, 709/225

(56) References Cited

U.S. PATENT DOCUMENTS

| 5,095,480 A | 3/1992 | Fenner |
| 5,241,594 A | 8/1993 | Kung |
| 5,423,002 A | 6/1995 | Hart |
| 5,426,637 A | 6/1995 | Derby et al. |
| 5,442,630 A | 8/1995 | Gagliardi et al. |
| 5,524,254 A | 6/1996 | Morgan et al. |
| 5,555,244 A | 9/1996 | Gupta et al. |
| 5,592,470 A | 1/1997 | Rudrapatna et al. |
| 5,610,910 A | 3/1997 | Focsaneanu et al. |
| 5,621,721 A | 4/1997 | Vatuone |
| 5,655,077 A | 8/1997 | Jones et al. |
| 5,659,542 A | 8/1997 | Bell et al. |
| 5,673,265 A | 9/1997 | Gupta et al. |
| 5,684,950 A | 11/1997 | Dare et al. |
| 5,699,521 A | 12/1997 | Iizuka et al. |
| 5,708,780 A | 1/1998 | Levergood et al. |
| 5,740,176 A | 4/1998 | Mazzola et al. |
| 5,742,604 A | 4/1998 | Edsall et al. |
| 5,764,756 A | 6/1998 | Onweller |
| 5,774,668 A * | 6/1998 | Choquier et al. ............. 709/223 |
| 5,787,248 A * | 7/1998 | Zupcsics et al. ............. 709/230 |
| 5,787,255 A | 7/1998 | Parlan et al. |
| 5,799,017 A | 8/1998 | Gupta et al. |
| 5,802,042 A | 9/1998 | Natarajan et al. |
| 5,812,768 A * | 9/1998 | Page et al. ................... 709/228 |
| 5,835,727 A | 11/1998 | Wong et al. |

(List continued on next page.)

FOREIGN PATENT DOCUMENTS

EP 0 567 217 10/1993 ........... H04L/12/46

OTHER PUBLICATIONS

Ascend Communications, Inc., "Remote Access Network Security", printed from http://www.ascend.com/1103.html, on Jul. 24, 1998, pp. 1–8.

Rigney, et al., "Remote Authentication Dial In User Service (Radius)", Network Working Group, RFC 2138, Apr. 1997, pp. 1–57.

*Primary Examiner*—Krisna Lim
(74) *Attorney, Agent, or Firm*—Thelen Reid & Priest LLP; David B. Ritchie (57) ABSTRACT

Network access requests, which may based on different access methods, are processed by using a protocol gateway that insulates the processing of the access requests from the specialized protocols required to obtain the necessary services required for the different access methods supported. In a first aspect of the present invention, this includes using a protocol handler that is responsive to the network protocol used by the access request. The protocol handler performs a set of steps necessary for responding to the access request. If the steps include procuring a state service, a state object is used to obtain the state service, insulating the protocol handler from having to communicate with a provider of the state service, such as a service component. Upon completion of the steps defined within the set of steps, the protocol handler denies or grants network access.

46 Claims, 4 Drawing Sheets

U.S. PATENT DOCUMENTS

| | | |
|---|---|---|
| 5,845,070 A | 12/1998 | Ikudome |
| 5,857,074 A | 1/1999 | Johnson |
| 5,867,495 A | 2/1999 | Elliott et al. |
| 5,883,893 A | 3/1999 | Rumer et al. |
| 5,898,780 A | 4/1999 | Liu et al. .................... 380/25 |
| 5,944,824 A | 8/1999 | He ........................... 713/201 |
| 5,918,016 A | 9/1999 | Chang et al. ............... 709/229 |
| 6,018,770 A | 1/2000 | Little et al. ................. 709/223 |
| 6,038,602 A * | 3/2000 | Ishikawa .................... 709/227 |
| 6,092,196 A | 7/2000 | Reiche ....................... 713/200 |
| 6,119,160 A | 9/2000 | Zhang et al. ............... 709/224 |
| 6,141,687 A | 10/2000 | Blair ......................... 709/225 |

* cited by examiner

RESPONDING TO NETWORK ACCESS REQUESTS USING A TRANSPARENT MEDIA ACCESS AND UNIFORM DELIVERY OF SERVICE

BACKGROUND OF THE INVENTION

1. Field of the Invention

The present invention relates to providing network access. More particularly, the present invention relates to providing network access which is compatible with different network protocols.

2. The Background

The Internet as a communication medium that is easily and economically available to the masses on a worldwide scale is a vision that arguably has been fulfilled in recent years. The proliferation of computers, computer-related devices (such as hand-held organizers), set-top boxes, or any tool that sends and/or receives digitized data has fed the demand for this vision. This is in accord with the premise that the sum of devices on a network are greater than the individual parts of the network. Concomitant with this proliferation of networked and data hungry devices is the increasing reliance on the Internet as the communication medium for which these devices may communicate.

However, because of bandwidth needs, cost, intended use, and/or applicability, these devices may not only employ disparate network access methods when seeking, network access to the Internet but typically also may use different network layers. Apart from the challenges of supporting network access across disparate physical layers (wireless, cable, twisted pair) and data-link layers, there is also the challenge of supporting different access methods used by the devices seeking Internet network access.

These challenges include supporting network access methods such as dial-up, cable modem, and ADSL (Asymmetric Digital Subscriber Line), while also maintaining a seamless level of service to a subscriber regardless of the type of network access method used. Solutions exist such as the system shown in FIG. 1, but do not tightly integrate the components used. This results in an approach that is not easily scaled so as to render difficult the ability to support new or additional access methods, may contain more than one user record database and may not consistently provide fault tolerance to the components in a unified way.

Figure 1:
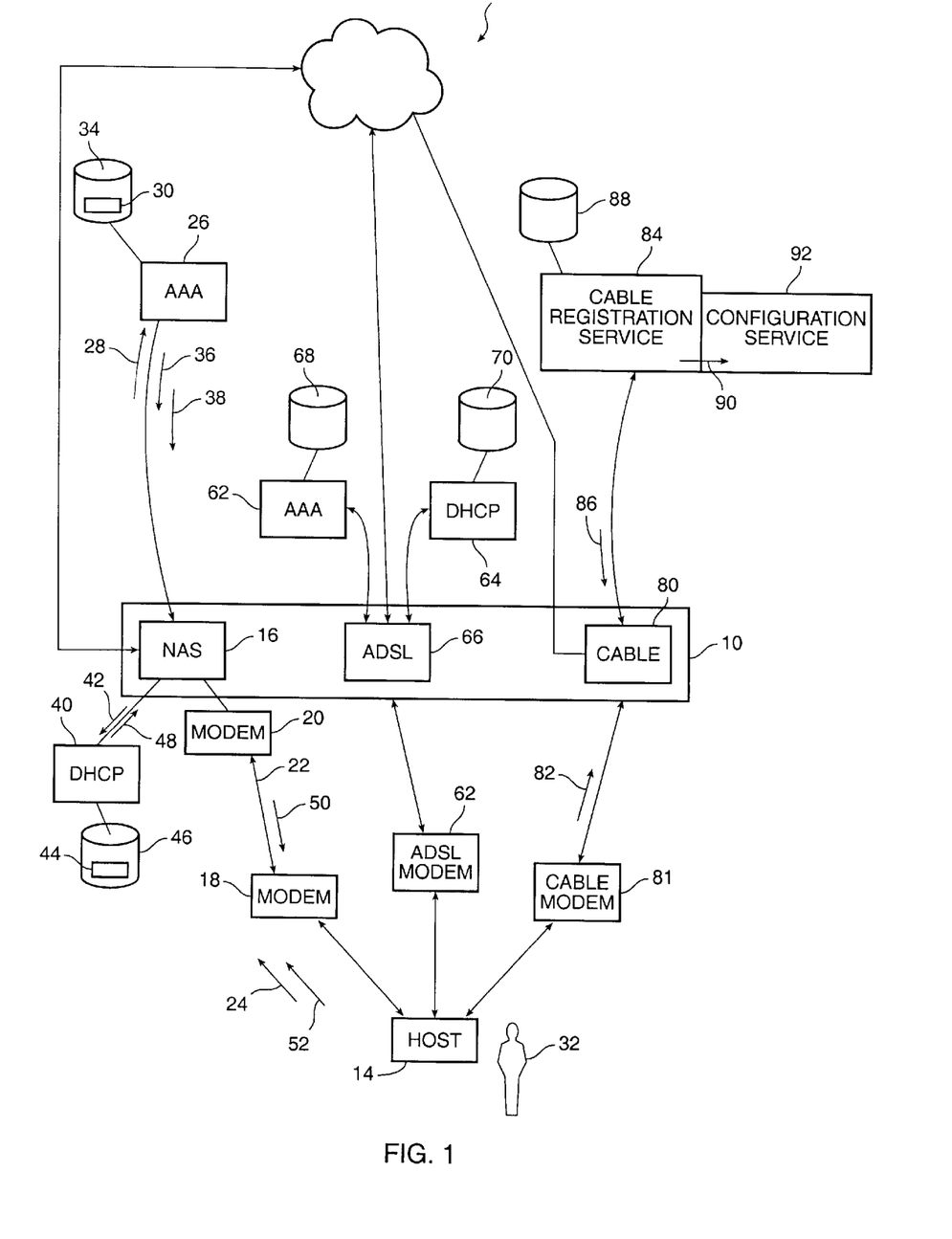
FIG. 1 is a block diagram of an example of a network access point which supports more than one access method for obtain network access to the Internet or a large scale computer network.

For example, an access point 10, which is connected to Internet 12 and that supports multiple network access methods, is shown in FIG. 1. One network access method shown includes using a dial-up method to obtain the services of Internet 12. Traditionally, a dial-up access method encompasses establishing a connection between a host 14 and a client supported by access point 10, such as a network access server (commonly referred to as "NAS") 16. This enables the physical and data link layer protocols used by host 14 (and a modem 18 used by the host) to be supported. For example, the physical medium used for a dial-up connection using a pair of modems 18 and 20 connected to a public switched telephone network (PSTN) 22 is a telephone line. Once the physical and data link protocols are established between modems 18 and 20, network access between 14 host and network access service 16 is attempted.

In a communication system such as the Internet, this usually requires host 14 to send an access request packet 24 to network access server 16. Upon receipt of packet 24, which contains the subscriber's user ID and password, network access service 16 attempts to authenticate the access request by sending the user ID and password to an authentication, authorization, and accounting (AAA) server 26. Those of ordinary skill in the art will readily recognize that a AAA server operates through the RADIUS (Remote Authentication Dial In User Service) application protocol. This enables network access server 16 to receive, process, and send the user ID and password to AAA server 26 as a RADIUS protocol compliant packet, hereinafter "RADIUS access request packet" 28.

Upon receipt of packet 28, AAA server 26 uses the user ID and password, which are encapsulated in packet 28, to provide authentication and authorization services. For example, AAA server 26 may extract the user ID and password attributes from packet 28 and obtain a user record 30 that corresponds to the subscriber 32 by using the extracted user ID as an index to find user record 30 in a user record database 34. Once user record 30 is obtained, the password is compared with the password contained in the record.

After performing the above authentication step AAA server 26 performs an authorization step by responding with either a RADIUS access accept packet 36 or access reject packet 38. If an access accept packet 36 is returned, network access service 16 will also need to provide an IP address by seeking the services of a DHCP server 40 (dynamic host configuration protocol). This requires network access service 16 to generate a DHCP discover packet 42 having the user ID, among other things.

Upon receipt of DHCP discover packet 42, DHCP server 40 obtains the user ID contained within packet 42 to obtain a user record 44 from a user record database 46. User record 44 is then used to determine whether a predetermined IP address should be returned to network access service 16 or whether an IP address should be obtained from a pool of IP addresses. The IP address obtained by DHCP server 40 is then sent to network access service 16 using a DHCP offer packet 48.

Upon receipt of DHCP offer packet 48, network access service 16 obtains the IP address from packet 48 and encapsulates it as a RADIUS packet 50 and sends it to host 14 via modems 20 and 18, respectively. Upon receipt of RADIUS packet 50, host 14 returns an accounting start packet 52 to network access service 16, triggering an accounting process to begin.

Access point 10 is also shown supporting an ADSL access method. An ADSL compliant client 60 must not only obtain AAA and DHCP services from servers 62 and 64, respectively, as in the dial-up access method discussed above, but it must also first translate a private address used by an ADSL modem 66. This requires providing and maintaining separate databases 68 and 70. Moreover, the user records stored in database 68, must also include attributes specific to information required by the ADSL modem such as a service type attribute 68. The service type attribute includes a list of services in which the user is subscribed, such as the VPDN (Virtual Private Dial-up Network) service.

Access point 10 is also shown supporting a cable modem access method via a client 80. Supporting a cable modem network access method does not require a host, such as host 14, to obtain AAA and DHCP services. Instead, an IP address and authentication services are obtained when host 14 sends a request for registration services packet 82 using the MCNS (Multimedia Cable Network System) protocol.

Under the cable modem network access method, a cable modem number (corresponding to cable modem 81) rather than a subscriber name is included with packet 82. Client 80 receives and then forwards packet 82 to a registration and configuration service 84. Service 84 receives packet 82 and returns registration information 86 by obtaining it from a database 88 using the cable modem number sent within packet 82. Client 80 receives registration information 86, converts it into the Trivial File Transfer Protocol (TFTP), and sends a configuration request packet 90 to configuration service 92. Configuration 92 receives packet 90 and returns an IP address and other configuration information which correspond to the information received in that packet. The IP address and other configuration information is received by client 80 which in turn, forwards them to host 14, enabling host 14 to proceed with the log-on process.

As can be seen above, supporting different access methods requires clients and services that can provide the states (services and tasks) which are required to establish a particular network service required by a given access method. This requires access to user information that may differ in content and format according to the type of network access method used. Meeting these requirements has resulted in an implementation in which the clients and the services used are loosely integrated. For example, each client is tightly coupled to each service that the client uses and each service has its own database of information. Such an approach renders difficult the ability to provide an access point that can be easily expanded to include new access methods (scalable) and that provides the same subscriber service for all types of access methods used and/or access point location (unified).

Accordingly, there is a need for supporting different access methods to the Internet, or an equivalent network, which is both scalable and unified.

SUMMARY OF THE INVENTION

Network access requests, which may be based on different access methods, are processed by using a protocol gateway that insulates the processing of the access requests from the specialized protocols required to obtain the necessary services required for the different access methods supported. In a first aspect of the present invention, a protocol handler responsive to the protocol used by the access request is utilized. The protocol handler performs a set of steps necessary for responding to the access request. If the steps include procuring a service, a state object is used to obtain the service, insulating the protocol handler from having to communicate with a provider of the service, such as a service component. Upon completion of the steps defined within the set of steps, the protocol handler denies or grants network access.

In a second aspect of the present invention, a task engine is used to treat each incoming access request as a task, optimizing the processing of each access request.

DETAILED DESCRIPTION OF A PREFERRED EMBODIMENT

In the following description, a preferred embodiment of the invention is described with regard to preferred process steps and data structures. However, those skilled in the art would recognize, after perusal of this application, that embodiments of the invention may be implemented using at least one general purpose computer operating under program control, and that modification of the general purpose computer to implement the components, process steps, and/or data structures described herein would not require undue invention.

In accordance with a presently preferred embodiment of the present invention, the components, process steps, and/or data structures are implemented using C++ programs running on an Enterprise 2000 server™ running SunSolaris™ as its operating system. The Enterprise 2000 server™ and SunSolaris™ operating system are available from Sun MicroSystems, Inc. of Mountain View, Calif. This implementation is not intended to be limiting in any way. Different implementations may be used and may include other types of operating systems, computing platforms, and/or computer programs. In addition, those of ordinary skill in the art will readily recognize that devices of a less general purpose nature, such as hardwired devices, devices relying on FPGA or ASIC technology, or the like, may also be used without departing from the scope and spirit of the inventive concepts disclosed herewith.

Figure 2:
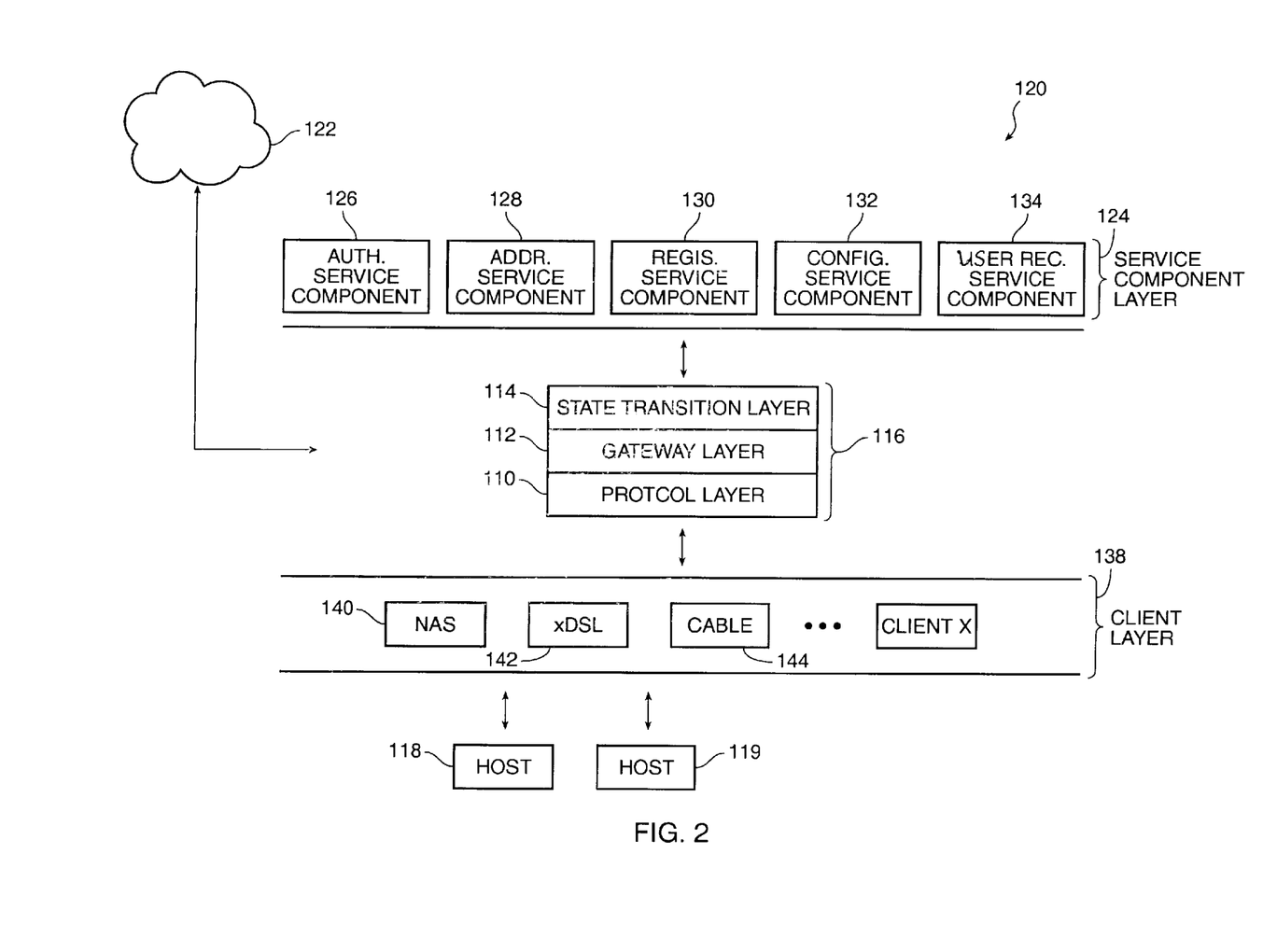
FIG. 2 is a block diagram of a set of element layers for supporting different access methods in a communications system having a set of access services and at least one host in accordance with a presently preferred embodiment of the present invention.

FIG. 2 is a block diagram of a set of element layers for supporting different access methods in a communications system having a set of access services and at least one host in accordance with a presently preferred embodiment of the present invention.

The set of element layers include a protocol layer 110, a gateway layer 112, and a state transition layer 114, herein collectively referred to as a protocol gateway 116. Protocol gateway 116 enables clients to properly process network access requests based on an access method which may differ depending on the type of hosts supported. For example, protocol gateway 116 may be used to provide a point of presence from which a dial-up host 118 and a host using a cable modem 119 may obtain network access to a communication system 120 using the Internet 122 as the network backbone.

Protocol layer 110 communicates with clients that receive access requests from supported hosts. Gateway layer 112 queues, load balances, and assigns protocol handlers to process each access request, which was sent by a client to protocol layer 110, according to the protocol used by the client to communicate with protocol layer 110. State transition layer 114 normalizes the steps that obtain a service from a service component and that are relevant to one of the access methods supported. This enables protocol gateway 116 to support multiple access methods.

Normalization of a step includes obtaining the services required for a given access method from service component layer 124. This enables the protocol handlers (which will be discussed further below) to use a common interface when seeking component services, avoiding the need to configure each protocol handler to be compatible with the different protocols and data formats required to obtain a service from a particular service component.

In accordance with a preferred embodiment of the present invention, service component layer 124 includes an authentication, authorization, and accounting (AAA) service component 126, an address procurement service component 128, a registration service component 130, a configuration service component 132, and a user record service component 134. AAA service component 126 may be provided using any authentication, authorization, and accounting (AAA) server, such as Cisco ACS or Cisco Secure, available from Cisco Systems, Inc. of San Jose, Calif.

Address procurement service component 128 may be provided using a DHCP (dynamic host configuration protocol) server, such as when communication system 120 is implemented using the Internet as the primary network backbone. DHCP servers are available from Software.com of Los Angeles, Calif. AAA and DHCP servers traditionally rely on the RADIUS and DHCP application protocols, respectively, for communication.

Registration service component 130 is responsive to registration request packets that request cable modem registration information. When based on the MCNS protocol, the packets each include a cable modem number attribute. The MCNS protocol is known by those of ordinary skill in the art. Upon receipt and after processing (which will be further described below), registration service component 130 returns a file name which will be used to obtain configuration information.

Configuration service component 132 is responsive to configuration request packets, each having a file name. Upon receipt of the packet, configuration service retrieves configuration information which corresponds to the file name, and returns this information to state transition layer 114. Registration service component 130 and configuration service component 132 may be provided using the Cisco Network Register product from Cisco Systems, Inc. of San Jose, Calif.

User record service component 134 is any program object that maintains a set of user records that correspond to the subscribers supported by the protocol gateway. For example, the user records may be stored in a user database having a front end that provides the necessary interface that allows for user record management, such as an in-memory database. The database may be implemented using BerkeleyDB available from Sleepy Cat Software, Inc., of Carlisle, Mass. In accordance with a preferred embodiment of the present invention, each user record contains all of the attributes that may be needed to support the access method selected by its corresponding subscriber. For example, a subscriber capable of obtaining network access through a cable modem and a dial-up modem would have a user record that would contain all of the attributes that are required by both types of access methods.

The number and type of services provided in service component layer 124 is not intended to be in any way limiting. Any combination or number of services may be supported which are required to support a particular access methodology. Those of ordinary skill in the art will readily recognize that service component layer 124 may be coupled to state transition layer 114 as devices on a network or as program objects and as such, are not intended to be limited in this manner.

Protocol gateway 116 is also coupled to a client layer 138 which provides the necessary interfaces for supporting physical and data-link protocols. For example, client layer may include a network access service (NAS) client 140 for supporting dial-up modems which use a public switched telephone network (PSTN), a digital subscriber line-based (hereinafter referred to as xDSL) client 142 for supporting a host which uses a DSL access method, a cable client 144 for supporting a host which uses a cable modem, and/or any other type of client that supports any of the access methods currently available. Network access service client 140 may be implemented using Cisco 5200, available from Cisco Systems, Inc. of San Jose, Calif. A xDSL client 142 may be implemented using Cisco 6100, while cable client 144 may be implemented using Cisco 901 and Cisco UBR 7200. These products are also available from Cisco Systems, Inc., of San Jose, Calif.

Figure 3:
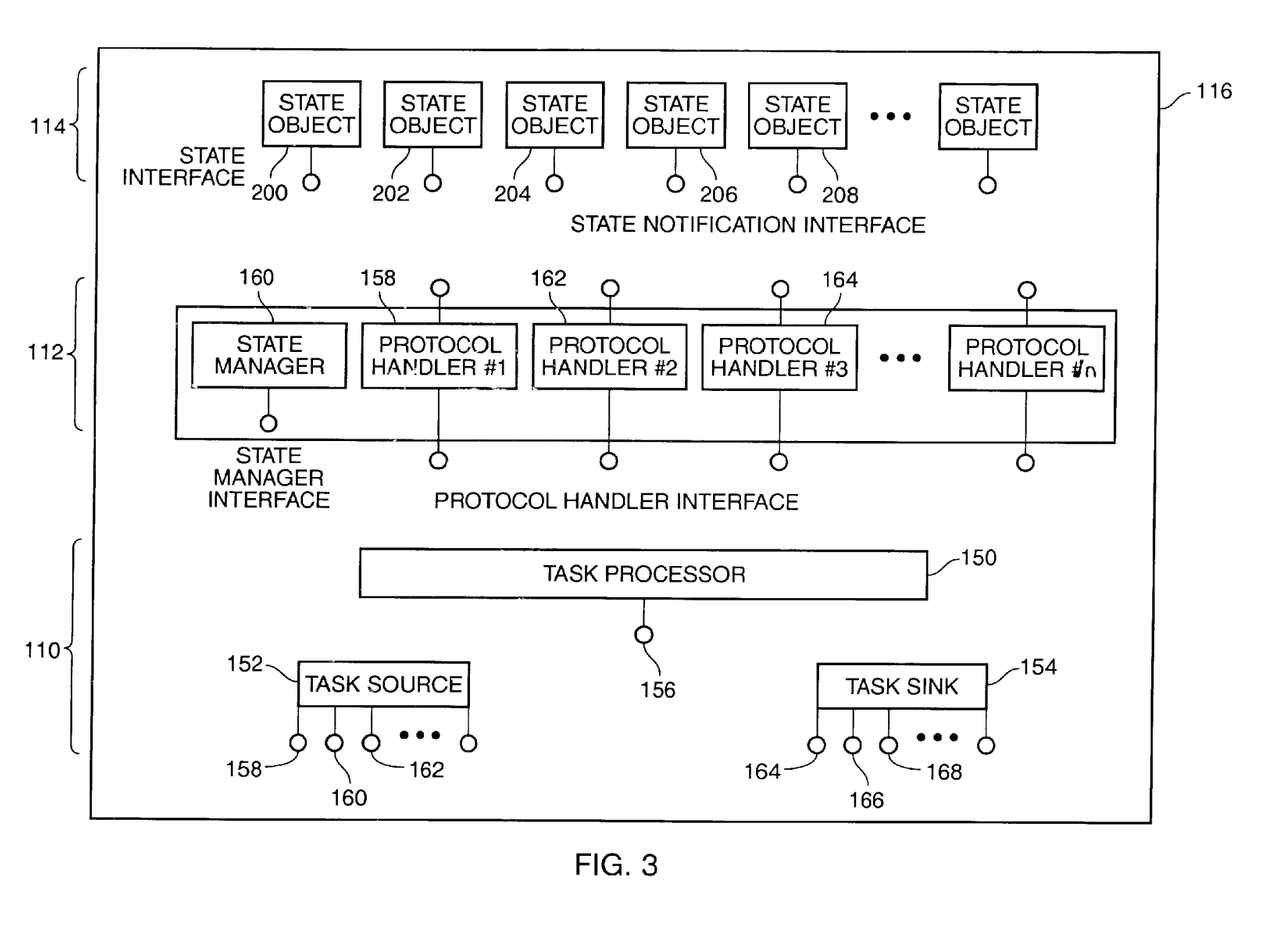
FIG. 3 is an expanded view of a set of element layers comprising a protocol gateway in accordance with a presently preferred embodiment of the present invention.

FIG. 3 is an expanded view of a set of element layers comprising a protocol gateway in accordance with a presently preferred embodiment of the present invention.

Protocol layer 110 of protocol gateway 116 (see FIG. 2) is shown having a task processor 150, a task source 152, a task sink 154, and a protocol gateway interface 156. Task source 152 includes at least one port, such as port 158, for receiving packets from a client. Each port is configured to support the application protocol used by a respective client supported by protocol gateway 116. For example, task source 152 may include ports 158, 160, and 162 which support the RADIUS, MCNS, and TFTP protocols, respectively. This enables task source 152 to receive packets from a client that uses the RADIUS protocol, such as network access server 140 or xDSL client 142, or from a client that uses both the MCNS and TFTP protocols, such as cable client 144 as shown in FIG. 2.

Similarly, task sink 154 includes at least one port for transmitting packets to a client. Each port is configured to support the application protocol used by a respective client supported by protocol gateway 116. For example, task sink may include ports 164, 166, and 168 which support the RADIUS, MCNS, and TFTP protocols, respectively. This enables task sink 154 to receive packets from a client that uses the RADIUS protocol, such as network access server 140 or xDSL client 142, or from a client that uses both the MCNS and TFTP protocols, such as cable client 144 as shown in FIG. 2.

The number of task processors, task sources, and task sinks shown are not intended to be limiting in any way. Additional task processors, task sources, and task sinks may be used but are not shown to avoid overcomplicating the present invention.

Protocol gateway interface 156 enables task processor 150 to receive packets form at least one task source, such as task source 152, and to send packets to at least one task sink, such as task sink 154. When a packet is received via protocol gateway interface 156, task processor 150 determines whether such a packet is supported. If so, protocol gateway 150 encapsulates the packet as a task, queues it for processing, and selects from gateway later 112 an available protocol handler, such as RADIUS protocol handler 178, which is configured to process the task according to a set of steps defined by state manager 170.

The set of steps defined by state manager 170 includes directing RADIUS protocol handler 178 to provide each state required for a particular access method. This enables protocol gateway 116 to normalize the services ("states") which are relevant to the supported access methods by having at least one state object within state transition layer 114 to obtain the services required for a given access method from at least one state provider, such as the state providers shown in service component layer 124 (see FIG. 2).

In accordance with a preferred embodiment of the present invention, there is a protocol handler for each application protocol that is required to provide a supported access method. For example, if a dial-up access method using the RADIUS protocol is supported, then a protocol handler is provided that communicates with a dial-up client using RADIUS, such as RADIUS protocol handler 178, and is configured to follow a set of steps defined by state manager 170. The set of steps directs RADIUS protocol handler 178 to provide the necessary states required to process an access request packet received from a dial-up client, such as NAS 140.

Similarly, if an xDSL access method is supported, then another protocol handler is provided, such as xDSL protocol handler 172, that is capable of communicating with a xDSL client and is configured to follow a set of steps defined by state manager 170. The set of steps defined directs xDSL protocol handler 172 to provide the necessary states required to process a task corresponding to an access request packet received from an xDSL client, such as xDSL client 142.

If a cable modem access method i s supported, a protocol handler is provided that communicates with a cable modem client, such as MCNS protocol handler 174, and is configured to follow a set of steps defined by state manager 170. The steps direct MCNS protocol handler 174 to provide the necessary states required to process a task encapsulating an access request packet received from a cable modem client, such as cable modem client 144. Thus, for each protocol used by a particular access method, the present invention provides a protocol handler compatible with the protocol and a set of steps which have been configured to direct a respective protocol handler to provide the necessary states required to respond to an access request based on a supported access method. Protocols other than those described are also supported, such as TACAS+, Diameter, DHCP, or equivalent protocol but are not further described to avoid overcomplicating the herein disclosure.

To provide the necessary states required by a protocol handler, each protocol handler has access to at least one state object which is configured to obtain services from a service component. Each state object is configured to use the protocol required to communicate with a state provider. This frees each protocol handler from dealing with the different protocols required to obtain the services which may differ depending on the service or service component selected. This enables protocol gateway 116 to normalize the steps required to support a particular network access method.

In accordance with a preferred embodiment of the present invention, task processor 150, task source 152, task sink 154, state manager 170, and protocol handlers 178, 172, and 174 are implemented using a multi-threaded task engine, which is known by those of ordinary skill in the art. Each packet received or sent may be buffered either through a queue or has table. Task source 152 and task sink 154 are implemented as software objects that transfer packets between clients and task processor 150. Task processor 150 is also a software object that determines whether a particular access request is supported and if so, queues the task and assigns a protocol handler to process the task. Each protocol handler is a thread managed by task processor 150. Each thread relies on a state table that defines the steps that the tread must perform to process a particular task. The present invention is not intended to be limited to using a multi-thread task engine. Other methods that implement the functional features described herein may also be used without departing from the scope and spirit of the disclosure.

In accordance with a preferred embodiment of the present invention, there is a state object for each service required within a given supported access method. For example, a dial-up network access method requires authentication and address procurement services. Consequently, protocol gateway 116 is configured to include an authentication state object 200, an address procurement state object 202, and a user record state object 204.

Authentication state object 200 is configured to communicate with authentication service component 126 (see FIG. 2). This includes sending a RADIUS access request packet to authentication service component 126 upon request for authentication by a protocol handler. Authentication state object 126 also receives response packets from authentication service component 126 which are then sent to the protocol handler which requested the authentication service. Those of ordinary skill in the art will readily recognize that information sent and received between a protocol handler and a state object may be queued, optimizing the performance of protocol gateway 116. This approach is not in any way intended to limit the present invention disclosed herein.

User record state object 204 is configured to respond to user record requests. For example, upon receipt of a RADIUS access request packet, authentication service 126 extracts the user ID and password attributes from the packet and uses them to obtain user record services through user record state object 204. Upon receiving the user record, authentication service component 126 would then be able to properly authenticate the request packet.

In accordance with a preferred embodiment of the present invention, address procurement state object 202 is configured to communicate with an address procurement service component 128 (see FIG. 2), such as a DHCP server, using a DHCP protocol. This includes sending a DHCP request packet to address procurement service when requested to obtain a network address, such as an IP address, by a protocol handler or a service component such as a AAA server. Address procurement state object 202 also receives response packets from address procurement service component 128 which are then sent to the protocol handler which requested the service.

The authentication and address procurement objects are not limited to a particular protocol handler and may be used by a protocol handler that supports another type of access method which requires similar services. For instance, the xDSL access method requires both authentication and address procurement services. Consequently, a protocol handler, such as xDSL protocol handler 172, following a set of steps that correspond to the xDSL access method would request authentication and address procurement services from state objects 200 and 202, respectively. As discussed above, the set of steps are managed by state manager 170 and are determined according to the access method being supported, which in this example, is the xDSL access method.

This approach of using state objects to communicate with service components may be extended to support network access requests forwarded by cable modem clients. As discussed above, cable modem network access requires a registration service and a configuration service. Consequently the present invention includes a registration service object 206 and a configuration service object 208. This enables a protocol handler, such as MCNS protocol handler 174 to obtain the necessary registration and configuration services when processing a task corresponding to a cable modem access request. MCSN protocol handler 174 obtains these services by following a set of steps imposed by state manager 170. State manager 170 is configured to define the steps and states required to properly respond to a particular network access request, such as a cable modem network access request.

Registration state object 206 is configured to communication with registration service component 130 using the MCSN protocol, while configuration state object 208 is configured to communication with a configuration service component 132 using the TFTP protocol. This enables MCNS protocol handler 174 to process a task corresponding to an access request packet received from a cable modem client such as cable modem client 144 (see FIG. 2). Upon assignment of the task to MCNS protocol handler 174, state manager 170 directs MCNS protocol handler 174 to perform the necessary steps required to process the task.

As is evident by the herein disclosure, the present invention can easily be modified to support additional network access methods simply by including another set of steps which define the necessary states that must be provided for each additional access method to be supported, another protocol handler, state objects which correspond the services needs, and access to state providers.

Figure 4:
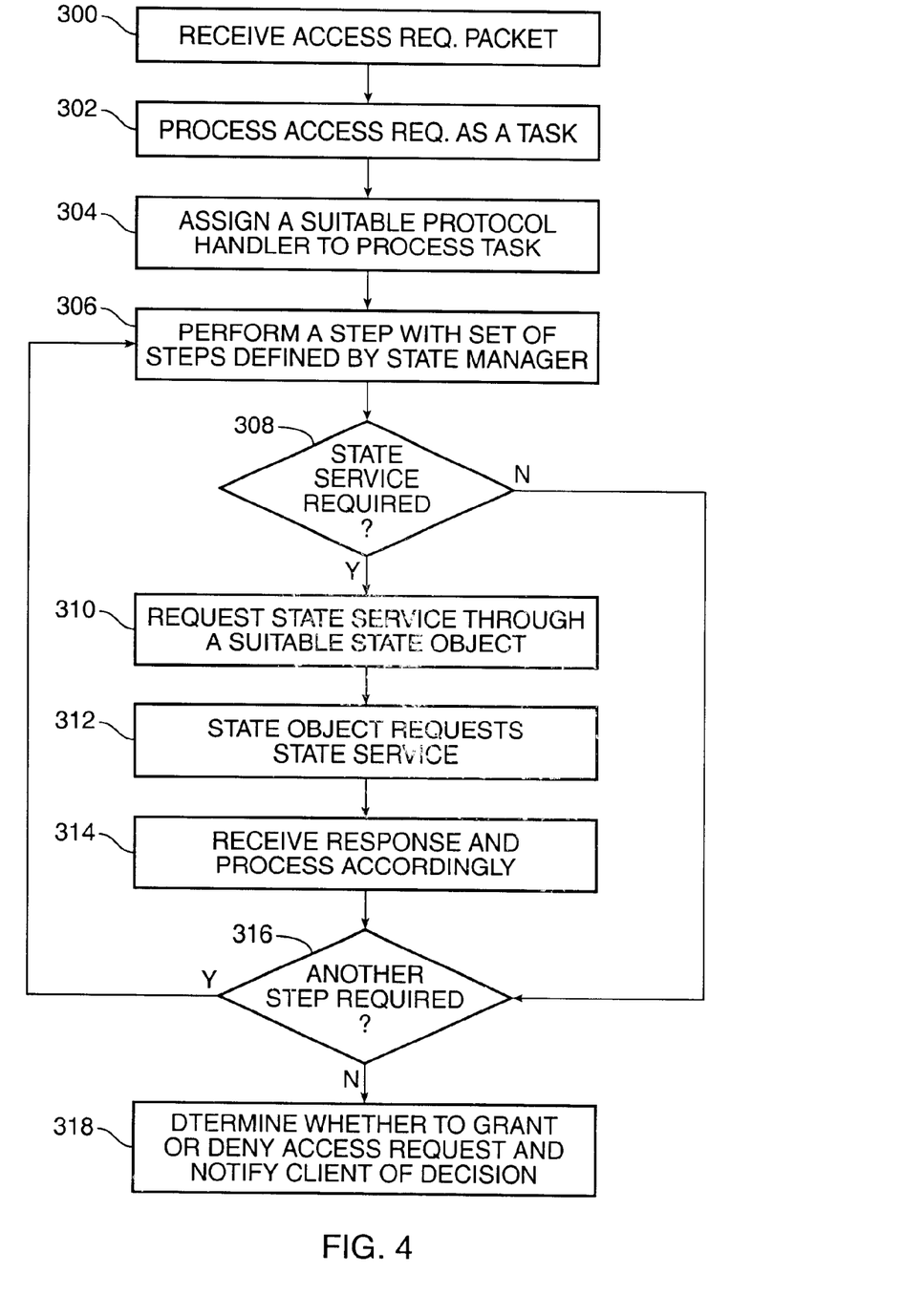
FIG. 4 is a flow diagram illustrating a process for supporting different network access methods in accordance with a presently preferred embodiment of the present invention.

FIG. 4 is a process flow diagram illustrating the steps performed for supporting different network access methods in accordance with a presently preferred embodiment of the present invention.

At step 300, a protocol gateway receives an access request from a client through a task source port.

At step 302, a task engine within the protocol gateway processes the access request as a task. This may include queuing the task within a queue or using a hash table. Step 302 may further include additional steps that would be apparent to those of ordinary skill in the art, such as checking whether the access request is supported by the protocol gateway. Because such additional steps are within the scope and teach of the herein disclosure they will not be further discussed to avoid over-complicating the discussion regarding the present invention.

At step 304, the task engine assigns a protocol handler which is configured to perform the necessary steps required to respond to the task. The steps performed by the protocol handler correspond to the type of access requested and are provided to the protocol handler by a state manager.

At step 306, the protocol handler performs a step within a set of steps defined by the state manager.

At step 308, if the step performed requires a service, then step 310 is performed.

At step 310, the protocol handler prompts a state object to send a request for services to a service component. The state object prompted is a state object that has been configured to communicate using a protocol that is compatible with the service component that will provide the state service. For example, if the protocol handler seeks authorization and authentication services, it will prompt a state object that has been configured to properly communicate with a service component that provides authorization and authentication services. Thus, if the service component is a AAA server using RADIUS as an application level protocol, a state object that has been configured to communicate using the RADIUS protocol is selected by the protocol handler to obtain authentication and authorization services.

At step 312, the state object contacts the state service contacted in step 310 by configuring a packet which corresponds to the protocol used by the service component. For example, if the service component is a AAA server using the RADIUS protocol, the packet sent is a RADIUS access request packet having the user ID and password of the user which is attempting to obtain network access.

At step 314, upon receipt of a state service reply packet, the state object forwards the reply packet to the protocol handler which requested the state service.

At step 316, upon receipt of the reply packet, the protocol handler determines whether the process is complete or whether additional steps are required. If not, then step 318 is performed, otherwise the process flow returns to step 306.

At step 318, the protocol handler determines whether to grant or deny the access request by returning a packet which corresponds to the decision to the port (via an appropriate task sink) coupled to the client which originally forwarded the access request packet in step 300.

If at step 308, state service is not required, the process flow branches to step 316.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

We claim:

1. A method of responding to network access requests which may be based on more than one type of network access protocol, said method comprising the steps of:

receiving a first access request which is based on a first network protocol;

processing said first access request using a subscriber service independent of said network access protocol as a first task;

processing said first task by using a first protocol handler chosen by a state manager responsive to said first network protocol, said first protocol handler performing a first set of steps necessary for responding to said first access request, said first set of steps including at least one service request;

procuring at least one service upon request by said first protocol handler; and granting or denying said first access request when a response to said step of procuring is received.

2. The method of claim 1, wherein said first set of steps define at least one transaction required to respond to said first access request, wherein said at least one transaction is compatible with said first network protocol.

3. The method of claim 1, further including the steps of:

receiving a second access request which is based on a second network protocol;

processing said second access request as a second task;

processing said second task by using a second protocol handler responsive to said second network protocol, said second protocol handler performing a second set of steps necessary for responding to said second access request, said second set of steps including at least one service request;

procuring at least one service when requested by said second protocol handler; and granting or denying said second access request in response to said step of procuring at least one service when requested by said second protocol handler.

4. The method of claim 1, further including a step of queuing said first response from said at least one service.

5. The method of claim 1, wherein said step of procuring at least one service includes a step of obtaining authentication and authorization services.

6. The method of claim 5, wherein said step of obtaining authentication, and authorization services includes obtaining a user identification (ID) and password from said access request and using said user ID and password to generate a remote authentication dial-in user service (RADIUS) authentication, authorization, and accounting request packet.

7. The method of claim 1, wherein said step of procuring at least one service includes a step of procuring a state service that provides a host address.

8. The method of claim 7, wherein said step of procuring a service that provides a host address includes generating a dynamic host configuration protocol (DHCP) host address request packet.

9. The method of claim 1, wherein said step of procuring at least one service includes a step of obtaining a service that provides a domain name service (DNS) component.

10. The method of claim 9, wherein said step of obtain in a state service that provides a domain name service includes generating a DNS request packet.

11. The method of claim 1, wherein said step of procuring at least one service includes a step of obtaining said service from a service component that provides a cable modem registration service.

12. The method of claim 11, wherein said step of obtaining a state service that provides a cable modem registration service includes generation a multimedia cable network system (MCNS) request packet.

13. The method of claim 12, wherein said step of obtaining a service further includes receiving configuration information corresponding to said MCNS request packet, said configuration information based on a trivial file transfer protocol (TFTP) protocol.

14. The method of claim 1, wherein said step of procuring at least one service includes a step of obtaining a state service that provides a user record service.

15. The method of claim 14, wherein said step of obtaining a service that provides a user record service includes generating a lightweight directory access protocol (LDAP) request packet.

16. A network access point responsive to more than one network access method, said network access point comprising:
   a protocol layer responsive to a first access request based on a first protocol;
   a state manager defining more than one set of process states required for each of the network access methods supported;
   at least one task engine for processing said first access request using a subscriber service independent of said network access method as a first task, said task engine having a set of protocol handlers;
   a first protocol handler from said set of protocol handlers which is responsive to a first set of process states within said more than one set of process states; and
   at least one state object which is responsive to at least one protocol handler from said set of protocol handlers.

17. The network access point of claim 16, wherein said first set of process states define the necessary transactions which must be performed by said first protocol handler in order to respond to said first access request.

18. The network access point of claim 16, wherein said set of protocol handlers further include a second protocol handler which is responsive to a second set of process states within said more than one set of process states.

19. The network access point of claim 16, further including at least one client for providing an access point interface between a host and said network access point.

20. The network access point of claim 19, wherein said at least one client includes a network access server.

21. The network access point of claim 19, wherein said at least one client includes a digital subscriber line-based interface.

22. The network access point of claim 19, wherein said at least one client includes a cable modem interface.

23. The network access point of claim 19, wherein said at least one client includes a wireless communication interface.

24. A communications system comprising:
   a protocol layer responsive to a first access request based on a first protocol;
   a state manager defining more than one set of process states required for each of the network access methods supported;
   at least one task engine for processing said first access request using a subscriber service independent of said network access method as a first task, said task engine having a set of protocol handlers;
   a first protocol handler from said set of protocol handlers which is responsive to a first set of process states within said more than one set of process states; and
   at least one state service responsive to at least one state object.

25. The communication system of claim 24, wherein said at least one state service includes at least one authentication, authorization, and accounting service component.

26. The communication system of claim 24, wherein said at least one service includes at least one dynamic host configuration protocol service component.

27. The communication system of claim 24, wherein said at least one state service includes at least one cable modem registration service component based on the multimedia cable network system (MCNS) protocol.

28. The communication system of claim 24, wherein said at least one state service includes at least one cable modem configuration service component based on the trivial file transfer protocol (TFTP) protocol.

29. The communication system of claim 24, further including a domain name service component.

30. The communication system of claim 24, further including an Internet backbone.

31. The communication system of claim 24, further including at least one client for interfacing a host with said protocol layer.

32. The communication system of claim 31, wherein said at least one client includes a network access server.

33. The communication system of claim 31, wherein said at least one client includes a digital subscriber line-based interface.

34. The communication system of claim 31, wherein said at least one client includes a cable modem interface.

35. The communication system of claim 31, wherein said at least one client includes a wireless communication interface.

36. The communication system of claim 24, wherein said first set of process states defines the necessary transactions which must be performed by said first protocol handler in order to respond to said first access request.

37. The communication system of claim 24, wherein said set of protocol handlers further include a second protocol handler which is responsive to a second set of process states within said more than one set of process states.

38. The communication system of claim 24, wherein said at least one state object is responsive to said first protocol handler.

39. A network access point responsive to more than one network access method, said network access point comprising:
- a protocol layer responsive to a first access request based on a first protocol;
- a state manager defining more than one set of process states required for each of the network access methods supported;
- a first protocol handler from said set of protocol handlers which is responsive to a first set of process states within said more than one set of process states; and
- at least one state object which is responsive to said first protocol handler.

40. The network access point of claim 39, wherein said first set of process states define the necessary transactions which must be performed by said first protocol handler in order to respond to said first access request.

41. The network access point of claim 39, further including a second protocol handler which is responsive to a second set of process states within said more than one set of process states.

42. The network access point of claim 39, further including at least one client for providing an access point interface between a host and said network access point.

43. The network access point of claim 42, wherein said at least one client includes a network access server.

44. The network access point of claim 42, wherein said at least one client includes a digital subscriber line-based interface.

45. The network access point of claim 42, wherein said at least one client includes a cable modem interface.

46. The network access point of claim 42, wherein said at least one client includes a wireless communication interface.

* * * * *